US 12,237,768 B2

United States Patent
Tjanaka et al.

(10) Patent No.: US 12,237,768 B2
(45) Date of Patent: Feb. 25, 2025

(54) CIRCUITS AND SYSTEMS FOR GENERATING POWER FROM MULTIPLE SOURCES

(71) Applicant: Arista Networks, Inc., Santa Clara, CA (US)

(72) Inventors: Willy Tjanaka, Santa Clara, CA (US); Mark Isfeld, San Jose, CA (US); Mehran Ataee, Santa Clara, CA (US); Shashi Kumar, Saratoga, CA (US); Charles Melvin Aden, Berkeley, CA (US)

(73) Assignee: ARISTA NETWORKS, INC., Santa Clara, CA (US)

( * ) Notice: Subject to any disclaimer, the term of this patent is extended or adjusted under 35 U.S.C. 154(b) by 238 days.

(21) Appl. No.: 17/899,397

(22) Filed: Aug. 30, 2022

(65) Prior Publication Data

US 2024/0072663 A1 Feb. 29, 2024

(51) Int. Cl.
*H02M 3/158* (2006.01)
*H02J 1/08* (2006.01)
*H02J 1/10* (2006.01)
*H02M 3/157* (2006.01)

(52) U.S. Cl.
CPC .............. *H02M 3/158* (2013.01); *H02J 1/082* (2020.01); *H02J 1/102* (2013.01); *H02M 3/157* (2013.01)

(58) Field of Classification Search
CPC ........ H02M 3/158; H02M 3/157; H02J 1/102; H02J 1/082
See application file for complete search history.

(56) References Cited

U.S. PATENT DOCUMENTS

| | | | | |
|---|---|---|---|---|
| 8,549,331 B2* | 10/2013 | Karam | ...................... | H04L 1/22 713/340 |
| 8,674,546 B1* | 3/2014 | Dix | ......................... | H04L 12/10 307/65 |
| 2007/0284946 A1* | 12/2007 | Robbins | .................... | H02J 1/10 307/18 |
| 2021/0044208 A1* | 2/2021 | Li | ..................... | H02M 3/33584 |
| 2022/0140746 A1* | 5/2022 | Liu | ........................... | H02J 3/06 363/71 |
| 2022/0255444 A1* | 8/2022 | Wang | ................... | H02M 1/0054 |

FOREIGN PATENT DOCUMENTS

WO WO2016059435 A1 4/2016

OTHER PUBLICATIONS

European Patent Office, Extended European Search Report, EP Application No. 23192934.0, dated Mar. 6, 2024, 5 pages.

* cited by examiner

*Primary Examiner* — Harry R Behm
(74) *Attorney, Agent, or Firm* — Fountainhead Law Group, PC

(57) ABSTRACT

Embodiments of the present disclosure include multiple DC-DC converters configured to generate multiple voltages based on one or more voltage sources. The DC-DC converters are configured to produce a first voltage and second voltage when a first power source is active, when a second power source is active, or when both the first and second power sources are active. In example embodiments, one voltage is used by a network device to power internal circuitry, and another voltage is coupled to tethered devices.

18 Claims, 5 Drawing Sheets

CIRCUITS AND SYSTEMS FOR GENERATING POWER FROM MULTIPLE SOURCES

BACKGROUND

The present disclosure relates generally to power management, and in particular, to circuits and systems for generating power from multiple sources.

With the growing prevalence and processing power of electronic systems, power generation and distribution is an increasingly important aspect of electronic systems. Electronic systems, such as networking equipment, require a power source that can generate voltage and current to power the internal circuits of the system. Traditionally, power was often received from an AC (alternating current) power source, such as a wall plug, or a battery. However, as electronic systems become more prevalent, it is increasingly difficult to provide AC outlets in all locations where the system may reside. Additionally, batteries run out of charge and must be recharged.

DETAILED DESCRIPTION

Described herein are techniques for generating power for electronic circuits and systems. In the following description, for purposes of explanation, numerous examples and specific details are set forth in order to provide a thorough understanding of some embodiments. Some embodiments as defined by the claims may include some or all of the features in these examples alone or in combination with other features described below, and may further include modifications and equivalents of the features and concepts described herein.

Features and advantages of the present disclosure include techniques for generating power. The present techniques may be used in a wide variety of applications where power is received from multiple sources and used to provide power to an electronic system or multiple electronic systems. The present disclosure illustrates application of the techniques described herein to a network device. However, it is to be understood that these techniques may be used in other applications.

The present disclosure presents an innovative technique for generating power from multiple sources, which may be used to tether electronic systems together to provide power to downstream systems regardless of physical location, for example.

In some embodiments, multiple power sources are coupled through DC-DC converters to drive multiple loads. The DC-DC converters provide at least two (2) output voltages for at least two loads. Respective outputs of the DC-DC converters are coupled together. Accordingly, the DC-DC converters may provide power to the loads together, and may share the loads (e.g. each providing some current to a particular load to produce a particular voltage). In some embodiments, an alternating current (AC) external power adapter is coupled to inputs of at least one of the DC-DC converters to generate power to the loads. In some embodiments, a return current from at least one load is selectively coupled to a return port on one or more of the DC-DC converters. When an external power adapter is providing power, the load return is selectively decoupled from the return ports of the DC-DC converter, and when the external power adapter is not providing power, the load return is selectively coupled to the return port of the DC-DC converter, for example. In various embodiments, one or more of the above techniques may be used individually. Examples using some or all of the techniques are illustrated below.

Figure 1:
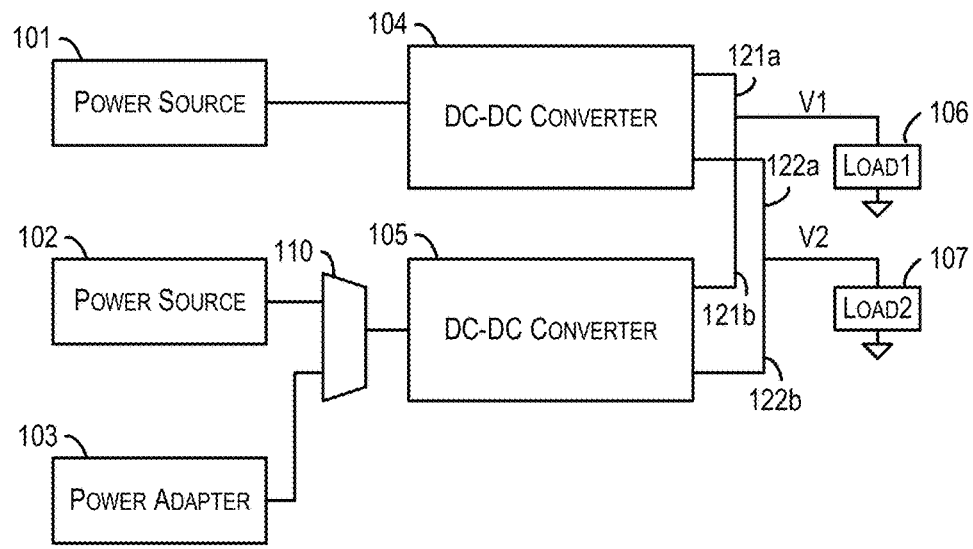
FIG. 1 illustrates a circuit for generating power according to an embodiment.

FIG. 1 illustrates a circuit for generating multiple voltages according to an embodiment. Here, multiple power sources 101 and 102 are coupled through DC-DC converters 104 and 105 to produce voltages V1 and V2 on loads 106 and 107. More specifically, power source 101 may produce a voltage and current at an input of DC-DC converter 104. DC-DC converter 104 has multiple outputs 121a and 122a (here, 2) for producing voltage V1 coupled to load 106 and voltage V2 coupled to load 107. In other embodiments, additional outputs may be included. Power source 102 may produce a voltage and current at an input of DC-DC converter 105. DC-DC converter 105 has multiple outputs 121b and 122b (e.g., the same as at least one other DC-DC converter) for producing voltage V1 coupled to load 106 and voltage V2 coupled to load 107. Accordingly, outputs of multiple DC-DC converters producing the same voltage (121a-b and 122a-b) may be coupled together.

DC-DC converters (aka "DC/DC converters") generally refer to circuits that receive direct current (DC) voltages and produce other DC voltages. Examples of such converters are typically switching DC-DC converters, such as Buck (Vin>Vo), Boost (Vo>Vin), and Flyback (described further below), which transfer energy into and out of one or more inductors between the inputs and outputs.

Here, a DC-DC converter 104 has an input configured to receive power from power source 101, a first output 121a to produce a first voltage V1, and a second output 122a to produce a second voltage V2. Features and advantages of the present disclosure may include at least a second DC-DC converter 105 having an input configured to receive power from power source 102, a first output 121b coupled to the first output 121a of DC-DC converter 104 to produce the first voltage V1, and a second output 122b coupled to the second output 122a of DC-DC converter 104 to produce the second voltage V2. DC-DC converters 104 and 105 are configured to produce the first voltage V1 and second voltage V2 when power source 101 is active, when power source 102 is active, or when both power sources 101 and 102 are active, for example.

Further in this embodiment, a power adapter 103 may be selectively coupled to DC-DC 105 to produce the first voltage V1 and the second voltage V2 when the power adapter 103 is active. For example, power adapter 103 may be an AC power adapter that receives an AC voltage and current (e.g., from a wall socket) and outputs a DC voltage. Power adapter 103 may have considerably more available power than power sources 101 and 102, for example, and may in some cases override the other power sources when it is active and generate voltage V1 and V2 on outputs 121*b* and 122*b* from DC-DC converter 105. In this example, power adapter 103 is coupled to the input of DC-DC converter 105 through a multiplexer 110, for example.

As illustrated in further examples below, the techniques shown in FIG. 1 may be used to provide power to tethered downstream devices. For example, the circuitry in FIG. 1 may be included in a variety of electronic devices, such as a network device. In one example below, the power sources are power over Ethernet ports, such as RJ45 connectors. RJ45 connectors refer to eight position/eight conductor twisted pairs in modular plugs typically used at the end of Ethernet patch cables. In various embodiments, power sources for a network device application may be coupled to power sourcing equipment (PSE), which may be another electronic device that is able to provide and source power on the twisted pair Ethernet cable, such as PoE switches, extenders, and injectors. Powered devices (PD) may be tethered to a network device as loads, for example. Powered devices (PD) include devices powered by power over Ethernet (PoE) such as IP telephones, RFID readers, 5G small cell radio units, Wi-Fi access points, thin clients, IP cameras, conference systems, public address systems or access control units, for example. In some cases, valid voltage ranges for RJ45 PoE connectors may be 42-57V. A valid voltage range for downstream power (e.g., a device receiving voltage V1 and acting as a load) may be 52-57V. Embodiments described below may be configured to regulate the output voltage V1 to 54-55V to provide sufficient margin, for example.

Figure 2:
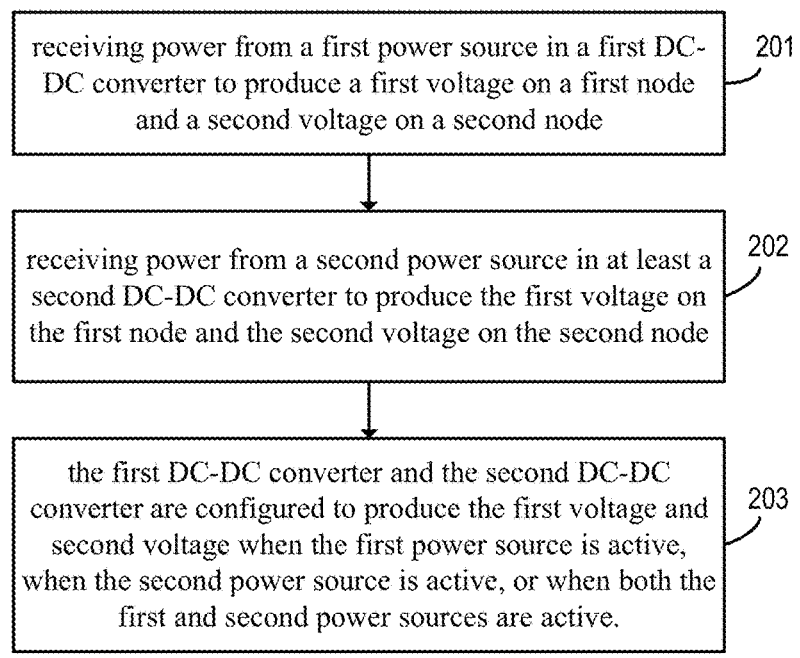
FIG. 2 illustrates a method of generating power according to an embodiment.

FIG. 2 illustrates a method of generating power according to an embodiment. At 201, power is received from a first power source in a first DC-DC converter to produce a first voltage on a first node and a second voltage on a second node. At 202, power is received from a second power source in at least a second DC-DC converter to produce the first voltage on the first node and the second voltage on the second node. At 203, the first DC-DC converter and the second DC-DC converter are configured to produce the first voltage and second voltage when the first power source is active, when the second power source is active, or when both the first and second power sources are active. For instance, when the first power source is active, the first DC-DC converter may produce the first and second voltages, when the second power source is active, the second DC-DC converter may produce the first and second voltages, and when both power sources are active both DC-DC converters produce the first and second voltages.

Figure 3:
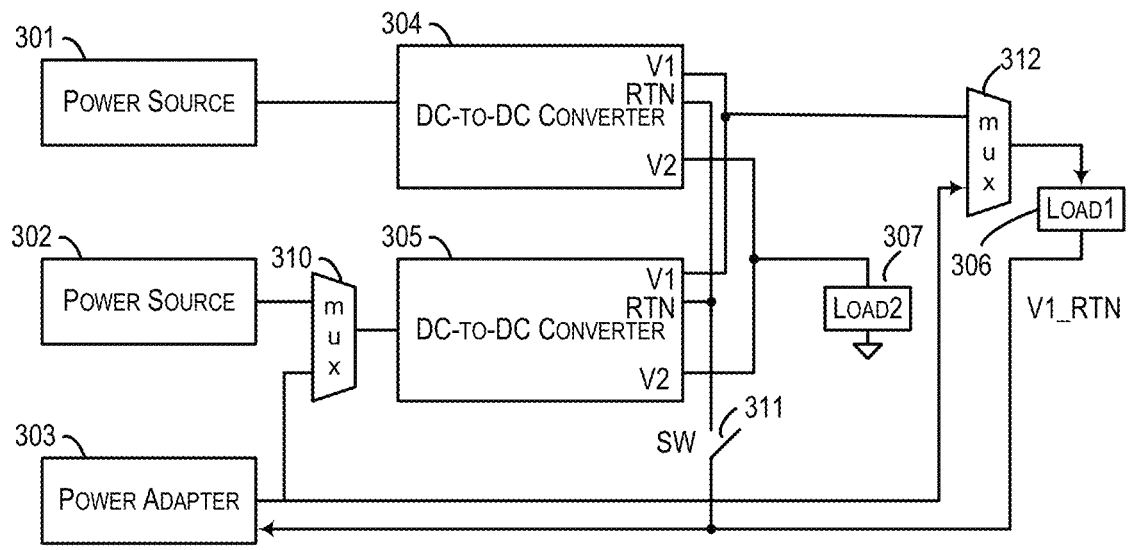
FIG. 3 illustrates a circuit for generating power according to another embodiment.

FIG. 3 illustrates a circuit for generating power according to another embodiment. Features and advantages of the present disclosure may include techniques for generating power from multiple sources including an auxiliary power adapter when an auxiliary power adapter is available. In this example, power sources 301 and 302 are coupled to DC-DC converters 304 and 305, respectively, to produce a voltage V1 (coupled to load 306) and voltage V2 (coupled to load 307). Additionally, a power adapter 303 is selectively coupled to DC-DC converter 305 to produce V1 and V2 when power adapter 303 is active. In this example, a voltage from power adapter 303 is coupled to the input of DC-DC converter 305 through multiplexer 310. The other input of multiplexer 310 is coupled to the output of power source 302. DC-DC converters 304 and 305 may have voltage outputs and at least one return line input (RTN) (e.g., here, for V1). A return line input may establish a common ground connection between at least one voltage output of the DC-DC converter (e.g., V1) and the load, for example. Further examples of return lines in a DC-DC converter are provided below. Here, DC-DC converter 304 has a return line input (RTN) relative to voltage output V1, and DC-DC converter 305 has a return line input (RTN) relative to voltage output V1. The circuit in FIG. 3 further includes at least one switch SW 311 coupled between a return line of load 306 (V1 RTN) receiving voltage V1 and a return line input (RTN) of DC-DC converter 304 to produce V1 and a return line input (RTN) of DC-DC converter 305 to produce V1. Switch 311 is closed when power adapter 303 is not active, thus allowing DC-DC converters 304/305 to drive load 306 with the grounds coupled together. Switch 311 is open when power adapter 303 is active and the grounds of load 306 and power adapter 303 are coupled together.

The circuit of FIG. 3 further includes a multiplexer 312 having an input coupled to V1, a second input coupled to power adapter 303, and an output coupled to an external load. In some embodiments, power adapter 303 may generate the same voltage V1, which may be coupled to external systems as a power input to power one or more external devices. In some embodiments, load 306 is an external system receiving power over an Ethernet connection, for example, although the present techniques may be used to provide power over a variety of other connections. When power adapter 303 is active, MUX 312 selects the power adapter input. When power adapter 303 is not active, MUX 312 may select V1 generated from DC-DC converters 304 and 305, for example.

Figure 4:
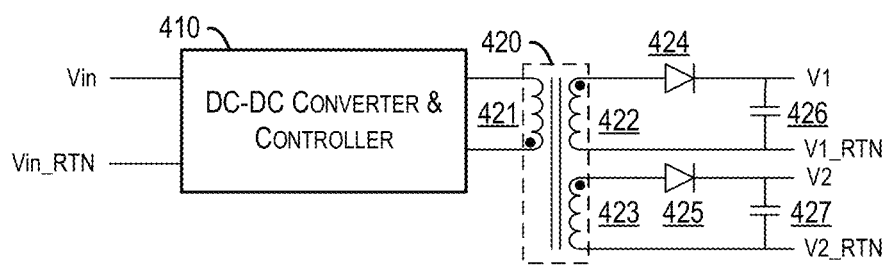
FIG. 4 illustrates an example DC-DC converter according to an embodiment.

FIG. 4 illustrates an example DC-DC converter according to an embodiment. In this example, a voltage Vin is input into a flyback DC-DC converter and controller 410 to set up an intermittent current into a single input/dual output transformer 420. The current returns to the input on terminal Vin RTN. Transformer 420 includes an input coil 421 and two output coils 422 and 423, which are opposite in polarity than the input coil. When current is increasing in coil 421, an opposite current is generated in coils 422 and 423. Power is transferred from Vin, through coil 421 to coils 422 and 423, through diodes 424/425, and onto capacitors 426/427. Loads (not shown) are typically coupled across the capacitors to receive power. Voltages V1 and V2 may be coupled through feedback loops to a controller in DC-DC converter 410 to control the timing of the current in coil 421, and thereby regulate the voltages V1 and V2.

Figure 5:
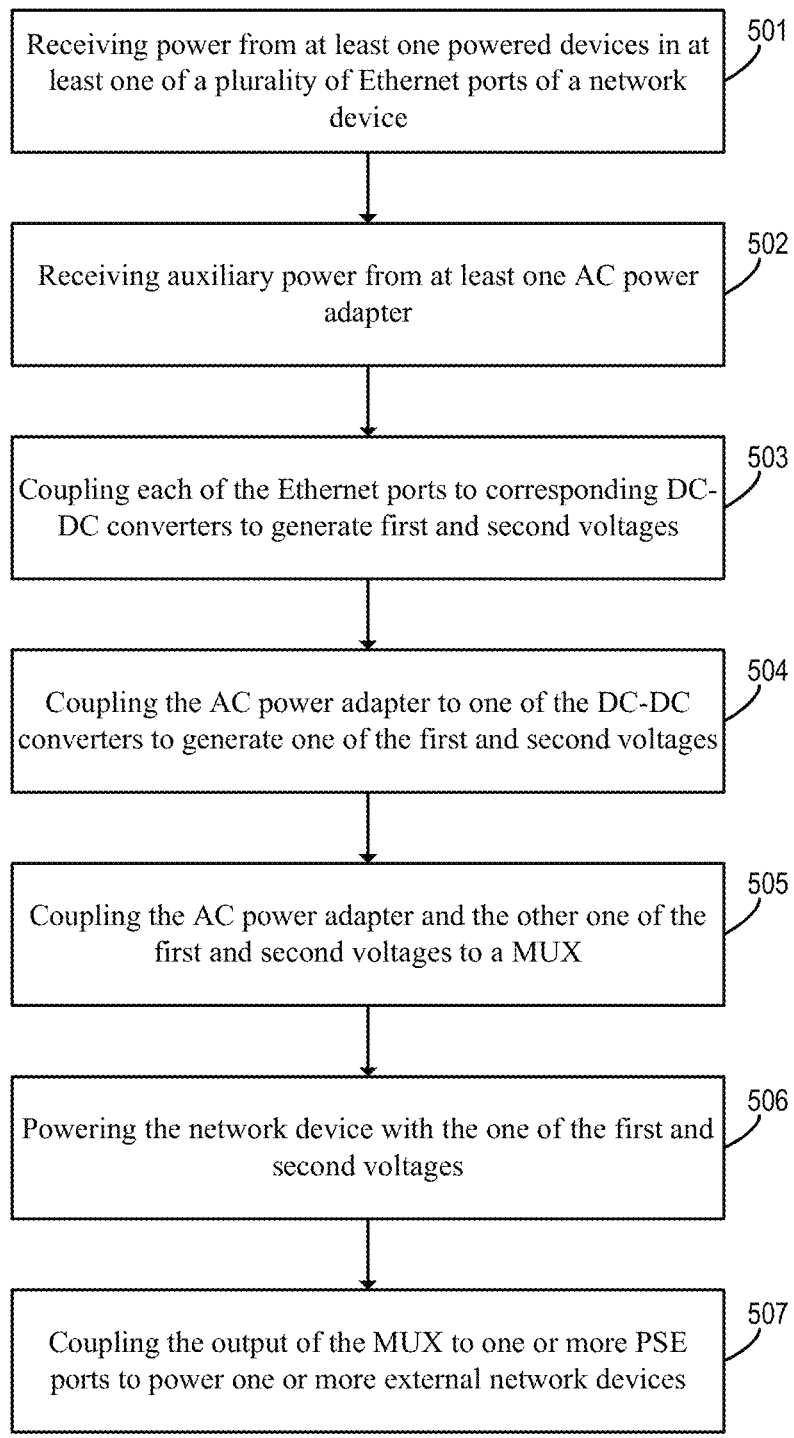
FIG. 5 illustrates generating power for network devices according to an embodiment.

Features and advantages of the present disclosure include powering network devices, such as switches, access points, and other networking equipment. FIG. 5 illustrates application of the present techniques to network devices. A network device may receive power over Ethernet (PoE) from at least one powered device in at least one port of a plurality of Ethernet ports of the network device, at 501. The network device may further receive auxiliary power from at least one AC power adapter, at 502. Each Ethernet port may be coupled to a corresponding DC-DC converter, at 503. The DC-DC converters each generate first and second voltages. The first and second voltages from each DC-DC converter are coupled together as described above. The AC power adapter is coupled to one of the DC-DC converters to generate one of the first and second voltages, at 504. The AC power adapter and the other one of the first and second voltages are coupled to a multiplexer (MUX), at 505. As illustrated below, the AC power adapter may carry a high voltage (e.g., 54 v) for powering other external network devices, and the other voltage may be 12 v for powering the local network device. Accordingly, the network device may be powered with one of the first and second voltages at 506, and the output of the MUX is coupled to one or more power sourcing equipment (PSE) ports to power one or more external network devices at 507. Further examples of circuits and architectures for performing these techniques are provided below.

Figure 6:
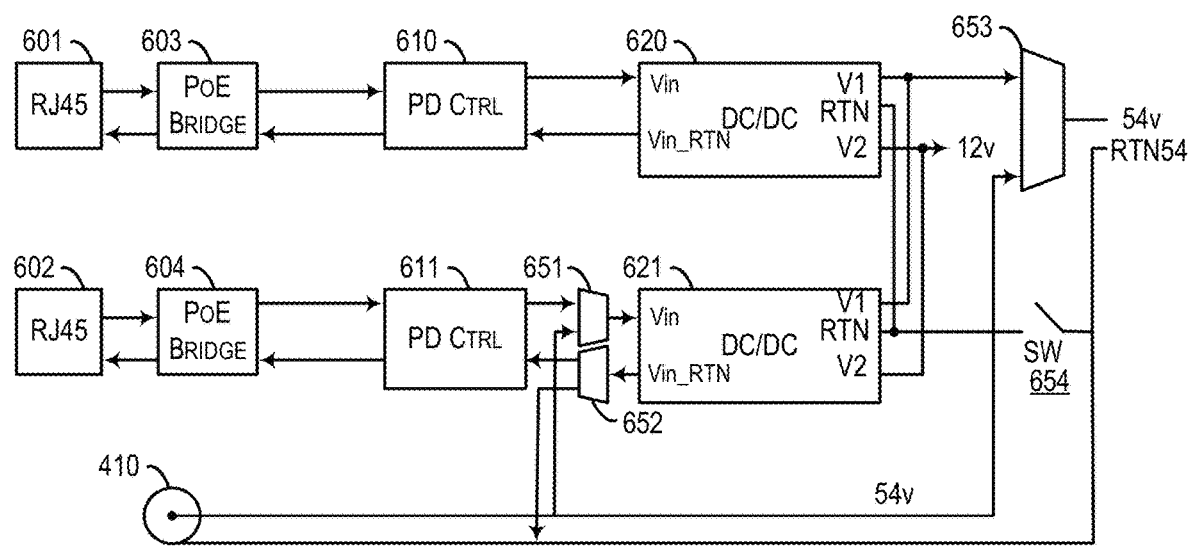
FIG. 6 illustrates a power over Ethernet (PoE) circuit according to an embodiment.

FIG. 6 illustrates a power over Ethernet (PoE) circuit according to an embodiment. In this example, the power sources are RJ45 connectors 601 and 602 that receive Ethernet cable inputs, which include voltages in the range of 42-57 volts, for example. Port 601 is coupled to a power over Ethernet (PoE) bridge 603, and port 602 is coupled to PoE bridge 604. PoE bridge 603 is coupled to PoE powered device controller (PD Ctrl) 610. Similarly, PoE bridge 604 is selectively coupled to PoE powered device controller (PD Ctrl) 611. Power sources from PoE ports (RJ45) are regulated using dual-output isolated flyback DC/DC converters 620 and 621. Each dual-output converter generates 54V and 12V at the same time using single stage power conversion. In some example implementations, the present technique may advantageously result in less loss from power conversion, which allows the use of cheaper heatsinks and provides more usable power, for example. In some embodiment, the techniques herein may use fewer components, which allows fitting the circuit into a smaller enclosure.

Features and advantages of the present disclosure allow an external power adapter 410 to co-exist with the dual-output converters. In this example, this is achieved by using power multiplexers 651, 652, and 653 and power switch (SW) 654 to configure external power adapter 410 as the primary power source. When the external power adapter is active (e.g., available and/or plugged into a wall socket), multiplexer 651 couples the 54 v external voltage on the power adapter to the input of DC/DC 621, de-multiplexer 652 couples the Vin return line (Vin RTN) of DC/DC 621 to the external power adapter return (RTN 54), and multiplexer 653 couples the 54 v external power adapter voltage to the output of multiplexer 653. Switch SW 654 is opened to isolate the current return path between external power adapter 410 and flyback converters 620/621. Further, when an external power adapter 410 is used, it also powers the system 12V power through DC/DC flyback converter 621. When external power adapter 410 is not active, DC/DC flyback converters 620 and 621 generate both 54 v and 12 v. As mentioned above, the 54 v output may be configured to regulate the output voltage to 54-55V to provide sufficient margin.

Figure 7:
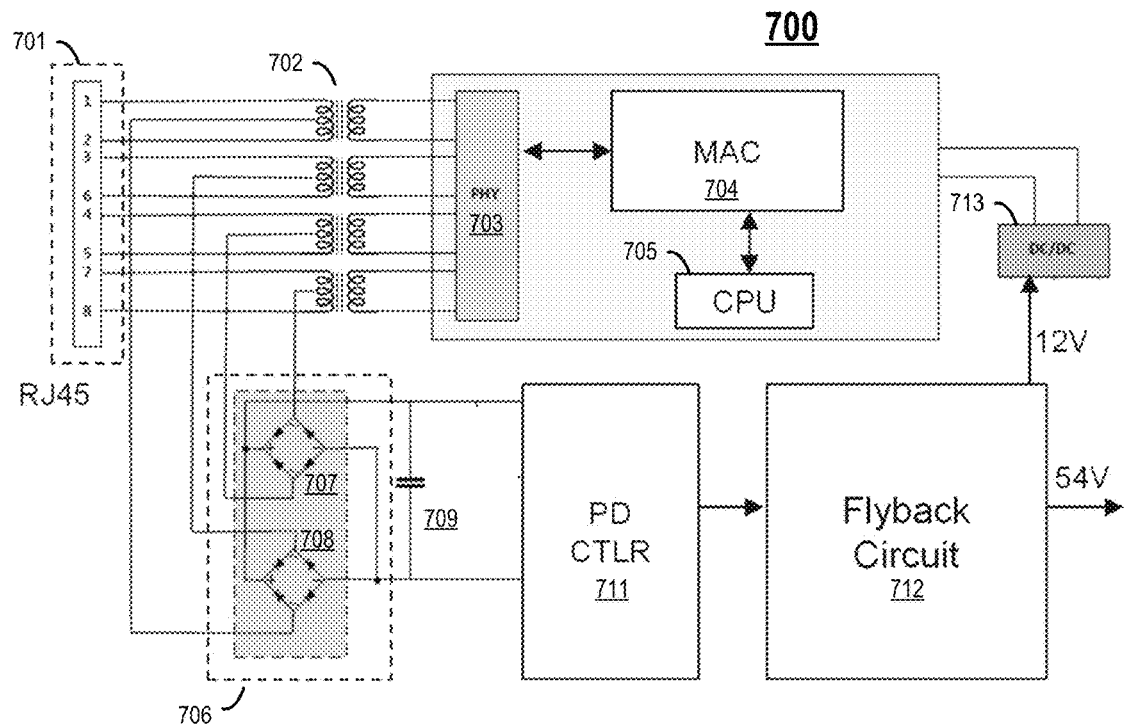
FIG. 7 illustrates an example network device including a power generation circuit according to an embodiment.

FIG. 7 illustrates an example network device including a power generation circuit according to an embodiment. In this example, a network device 700 includes a RJ45 Ethernet connector input 701. Data may be coupled through transformers 702 into a physical layer interface (PHY) 703. Additionally, power may be received over the Ethernet connection through a power over Ethernet (PoE) bridge 706, which in this example comprises diode bridges 707 and 708. A diode bridge is a bridge rectifier circuit of four diodes arranged as shown that is used in the process of converting alternating current (AC) from the input terminals to the direct current (DC). The outputs of the diode bridges are coupled together and across capacitor 709 and provided as inputs to PD CTRL 711. The output of PD CTRL 711 is coupled to a flyback circuit 712, which outputs a high voltage (here, 54V) and a supply voltage for network device 700 (here, 12V). The network device supply voltage (12V) may be coupled through a DC/DC converter 713 to produce one or more DC voltages required by circuitry inside network device 700, such as central processing unit (aka processor) 705 and media access controller (MAC) 704, and PHY 703, for example. The high voltage output of the flyback circuit may be coupled to downstream devices over an Ethernet cable, for example.

Figure 8:
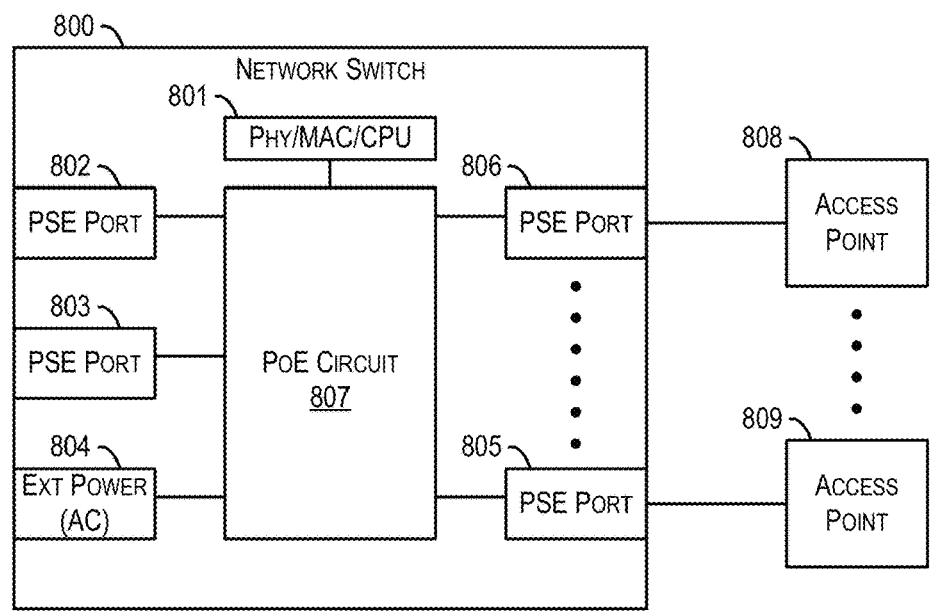
FIG. 8 illustrates network switch including a power generation circuit according to an embodiment.

FIG. 8 illustrates network switch 800 including a power generation circuit according to an embodiment. In this example, network switch 800 includes ports 802-806, PoE circuit 807, and switch circuitry 801 comprising PHY, MAC, and CPUs for implementing the functionality of the network switch. PSE ports 802 and 803 may be power supply equipment ports, which may receive Ethernet cables and provide data and power to a device. Port 804 may be configured to receive an external AC adapter. PSE ports 805-806 may be power supply ports that supply power to other network devices, such as access points 808 and 809, respectively. Accordingly, network switch 800 receives power from one or more of ports 802-804, boosts the voltage, and redistributes the voltage to ports 805-806. Thus, embodiments of the present disclosure may receive power and data over an Ethernet port, receive power optionally over an external AC power adapter, and provide power to both internal circuitry as well as tethered downstream electronic devices.

FURTHER EXAMPLES

Each of the following non-limiting examples may stand on its own or may be combined in various permutations or combinations with one or more of the other examples.

In one embodiment, the present disclosure includes a circuit for generating multiple voltages comprising: a first DC-DC converter having an input configured to receive power from a first power source, a first output to produce a first voltage, and a second output to produce a second voltage; at least a second DC-DC converter having an input configured to receive power from a second power source, a first output coupled to the first output of the first DC-DC converter to produce the first voltage, and a second output coupled to the second output of the first DC-DC converter to produce the second voltage, wherein the first DC-DC converter and the second DC-DC converter are configured to produce the first voltage and second voltage when the first power source is active, when the second power source is active, or when both the first and second power sources are active.

In another embodiment, the present disclosure includes a network device comprising: one or more processors; network circuitry; and power circuitry comprising: a first DC-DC converter having an input configured to receive power from a first power source, a first output to produce a first voltage, and a second output to produce a second voltage; at least a second DC-DC converter having an input configured to receive power from a second power source, a first output coupled to the first output of the first DC-DC converter to produce the first voltage, and a second output coupled to the second output of the first DC-DC converter to produce the second voltage, wherein the first DC-DC converter and the second DC-DC converter are operable to produce the first voltage and second voltage when the first power source is active, when the second power source is active, or when both the first and second power sources are active.

In one embodiment, the present disclosure further comprises a power adapter selectively coupled to the input of the second DC-DC converter to produce the first voltage and the second voltage when the power adapter is active.

In one embodiment, the present disclosure further comprises a multiplexer having a first input coupled to the first voltage, a second input coupled to the power adapter, and an output coupled to a load.

In one embodiment, the power adapter is an AC power adapter.

In one embodiment, the present disclosure further comprises at least one switch having a first terminal coupled to a return line of a load receiving the first voltage and a second terminal coupled a return line input of the first DC-DC converter to produce the first voltage and a return line input of the second DC-DC converter to produce the first voltage, wherein the switch is open when the power adapter is active and the switch is closed when the power adapter is not active.

In one embodiment, the load is an external system receiving power over an Ethernet connection.

In one embodiment, the present disclosure further comprises: a first multiplexer circuit having a first input to receive a voltage from the at least the second power source, a second input to receive a voltage from the power adapter, and an output coupled to an input of the second DC-DC converter; and a second de-multiplexer circuit having a first input coupled to a return input of the second DC-DC converter, a first output coupled to a return from the at least the second power source, a second output coupled to a return from the power adapter.

In one embodiment, the first DC-DC converter and the at least a second DC-DC converter are flyback DC-DC converters.

In one embodiment, the first voltage is coupled to a port to power an external system and wherein the second voltage is configured to power internal circuits of a system.

In one embodiment, the first power source is a first Ethernet cable, the second power source is a second Ethernet cable, the second voltage is configured to power the network device, and the first voltage is coupled to one or more Ethernet cables to power a corresponding one or more external devices.

In another embodiment, the present disclosure includes a method of generating multiple voltages comprising: receiving power from a first power source in a first DC-DC converter to produce a first voltage on a first node and a second voltage on a second node; receiving power from a second power source in at least a second DC-DC converter to produce the first voltage on the first node and the second voltage on the second node, wherein the first DC-DC converter and the second DC-DC converter are configured to produce the first voltage and second voltage when the first power source is active, when the second power source is active, or when both the first and second power sources are active.

The above description illustrates various embodiments along with examples of how aspects of some embodiments may be implemented. Accordingly, the above examples and embodiments should not be deemed to be the only embodiments, and are presented to illustrate the flexibility and advantages of some embodiments as defined by the following claims. Based on the above disclosure and the following claims, other arrangements, embodiments, implementations and equivalents may be employed without departing from the scope hereof as defined by the claims.

What is claimed is:

1. A circuit for generating multiple voltages comprising:
a first DC-DC converter having an input configured to receive power from a first power source, a first output to produce a first voltage, and a second output to produce a second voltage;
at least a second DC-DC converter having an input configured to receive power from a second power source, a first output coupled to the first output of the first DC-DC converter to produce the first voltage, and a second output coupled to the second output of the first DC-DC converter to produce the second voltage, wherein the first DC-DC converter and the second DC-DC converter are configured to produce the first voltage and second voltage when the first power source is active, when the second power source is active, or when both the first and second power sources are active; and
a power adapter selectively coupled to the input of the second DC-DC converter to produce the first voltage and the second voltage when the power adapter is active.

2. The circuit of claim 1 further comprising a multiplexer having a first input coupled to the first voltage, a second input coupled to the power adapter, and an output coupled to a load.

3. The circuit of claim 1 wherein the power adapter is an AC power adapter.

4. The circuit of claim 1 further comprising at least one switch having a first terminal coupled to a return line of a load receiving the first voltage and a second terminal coupled a return line input of the first DC-DC converter to produce the first voltage and a return line input of the second DC-DC converter to produce the first voltage, wherein the switch is open when the power adapter is active and the switch is closed when the power adapter is not active.

5. The circuit of claim 4 wherein the load is an external system receiving power over an Ethernet connection.

6. The circuit of claim 4 further comprising:
a first multiplexer circuit having a first input to receive a voltage from the at least the second power source, a second input to receive a voltage from the power adapter, and an output coupled to an input of the second DC-DC converter; and
a second de-multiplexer circuit having a first input coupled to a return input of the second DC-DC converter, a first output coupled to a return from the at least the second power source, a second output coupled to a return from the power adapter.

7. The circuit of claim 1 wherein the first DC-DC converter and the at least a second DC-DC converter are flyback DC-DC converters.

8. The circuit of claim 1 wherein the first voltage is configured to power an external system via a port and wherein the second voltage is configured to power internal circuits of a system.

9. A network device comprising:
one or more processors;
network circuitry; and
power circuitry comprising:
a first DC-DC converter having an input configured to receive power from a first power source, a first output to produce a first voltage, and a second output to produce a second voltage;
at least a second DC-DC converter having an input configured to receive power from a second power source, a first output coupled to the first output of the first DC-DC converter to produce the first voltage, and a second output coupled to the second output of the first DC-DC converter to produce the second voltage, wherein the first DC-DC converter and the second DC-DC converter are operable to produce the first voltage and second voltage when the first power source is active, when the second power source is active, or when both the first and second power sources are active; and a power adapter selectively coupled to the input of the second DC-DC converter to produce the first voltage and the second voltage when the power adapter is active.

10. The network device of claim 9 wherein the first power source is a first Ethernet cable, the second power source is a second Ethernet cable, the second voltage is configured to power the network device, and the first voltage is coupled to one or more Ethernet cables to power a corresponding one or more external devices.

11. The network device of claim 9 further comprising a multiplexer having a first input coupled to the first voltage, a second input coupled to the power adapter, and an output coupled to a load.

12. The network device of claim 9 wherein the power adapter is an AC power adapter.

13. The network device of claim 9 further comprising at least one switch having a first terminal coupled to a return line of a load receiving the first voltage and a second terminal coupled a return line input of the first DC-DC converter to produce the first voltage and a return line input of the second DC-DC converter to produce the first voltage, wherein the switch is open when the power adapter is active and the switch is closed when the power adapter is not active.

14. The network device of claim 13 wherein the load is an external system receiving power over an Ethernet connection.

15. The network device of claim 13 further comprising:
a first multiplexer circuit having a first input to receive a voltage from the at least the second power source, a second input to receive a voltage from the power adapter, and an output coupled to an input of the second DC-DC converter; and
a second de-multiplexer circuit having a first input coupled to a return input of the second DC-DC converter, a first output coupled to a return from the at least the second power source, a second output coupled to a return from the power adapter.

16. The network device of claim 9 wherein the first DC-DC converter and the at least a second DC-DC converter are flyback DC-DC converters.

17. The network device of claim 9 wherein the first voltage is configured to power an external system via a port and wherein the second voltage is configured to power internal circuits of the network device.

18. A method of generating multiple voltages within a system comprising:
receiving power from a first power source in a first DC-DC converter to produce a first voltage on a first node and a second voltage on a second node;
receiving power from a second power source in at least a second DC-DC converter to produce the first voltage on the first node and the second voltage on the second node,
wherein the first DC-DC converter and the second DC-DC converter are configured to produce the first voltage and second voltage when the first power source is active, when the second power source is active, or when both the first and second power sources are active, and
wherein the first voltage is configured to power an external system via a port and wherein the second voltage is configured to power internal circuits of the system.

* * * * *